DISCRIMINATOR AND PULSE FORMING CIRCUIT

Filed March 22, 1962

INVENTOR.
PETER E. OSBORN

BY J. Warren Whitesel

ATTORNEY

United States Patent Office 3,204,042

Patented Aug. 31, 1965

3,204,042

DISCRIMINATOR AND PULSE FORMING CIRCUIT

Peter E. Osborn, Chicago, Ill., assignor to International Telephone and Telegraph Corporation, New York, N.Y., a corporation of Maryland Filed Mar. 22, 1962, Ser. No. 181,699
11 Claims. (Cl. 179—18)

Figure 1:
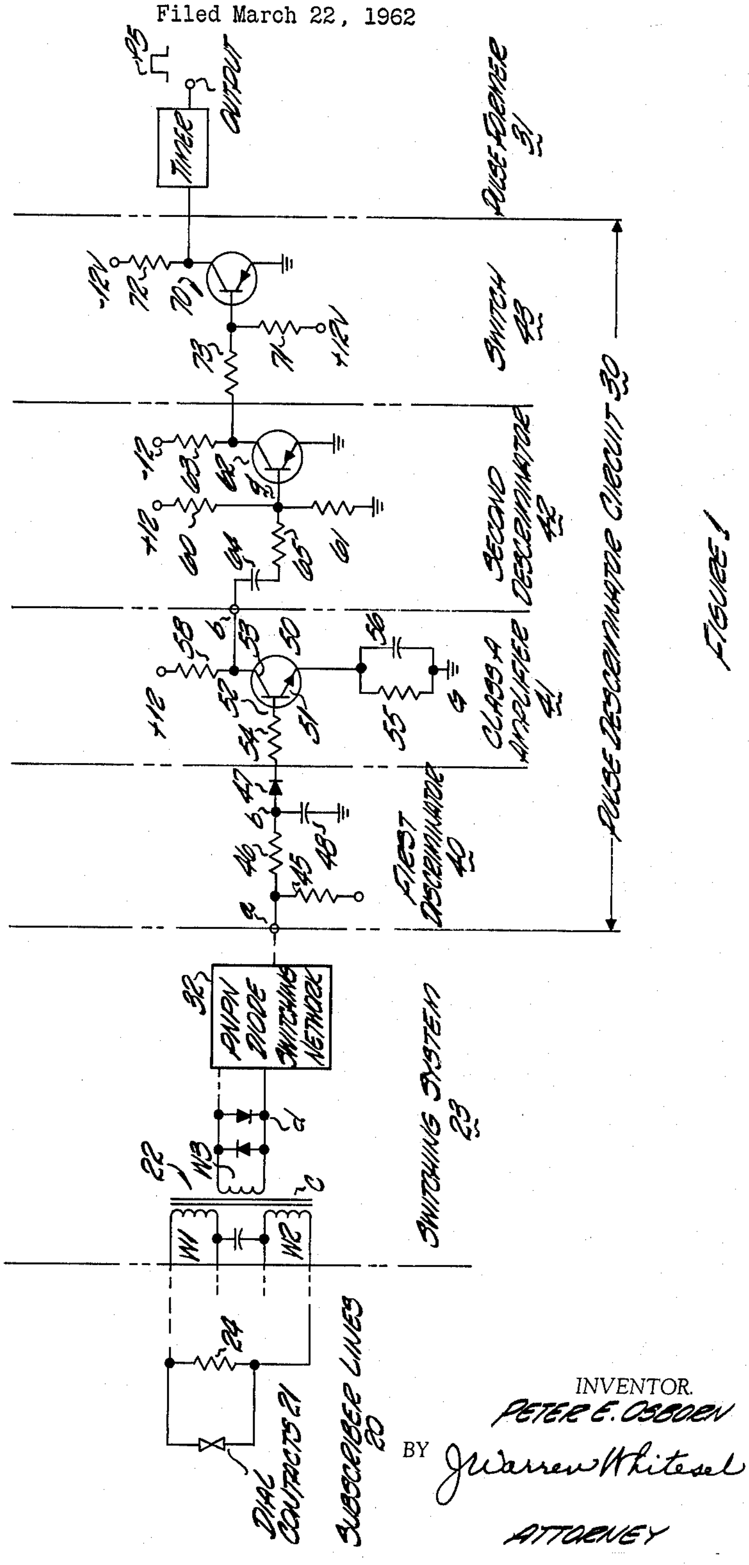

This invention relates to discriminator and pulse forming circuits and more particularly to such circuits especially—although not exclusively—adapted for use in dial pulse controlled telephone systems.

For many years, automatic telephone systems have been controlled by dial pulses generated by the well known telephone dial. Now, however, this dial is no longer the device that is best adapted to control these systems. In fact, such dials are rapidly becoming the least desirable control device. This is aside from the point, however, because millions of dial telephones are in current use. The cost of replacing all of these telephones would be prohibitive. Therefore, new telephone systems should be adapted to use the existing dials until they are worn out and control devices can be adopted.

To illustrate the problems of dial usage, reference is made by way of example, to the needs of one recently developed electronic switching telephone system. That system is shown in a co-pending application entitled, "Electronic Switching Telephone System," Serial No. 181,626, filed March 22, 1962, by Arseneau-Bereznak-Osborn, and assigned to the assignee of this invention.

That system includes a self-seeking network of current controlled PNPN diode crosspoints for interconnecting subscriber lines. Switch paths find their own course through randomly selected crosspoints in the network. Among other things, these self-seeking paths can find their own way because there are minute differences between the individual PNPN diodes. As a result of these differences, the voltage drop across completed paths may vary by approximately two volts in the above-mentioned system. The dial or other control pulses transmitted over these paths are abrupt changes from a reference voltage, the change being approximately seven-tenths of a volt. The voice or other information signal voltage variations transmitted over the same paths fluctuate between zero and seven-tenths of a volt from the reference voltage.

Therefore, the system must pick out the seven-tenths of a volt variations which represent dial or other control pulses and reject the seven-tenths of a volt variations which represent voice or other information signals. This must be done despite the fact that the normal, meaningless, variations in the voltage drop across the switch paths may be in the order of two volts, i.e., three or four times greater than the dial or other control pulses.

In selecting the exemplary values of two volts for meaningless variations and seven-tenths of a volt for meaningful variations, I have made an effort to give the values which, for meaningful variations, might reasonably be expected. However, no particular significance should be attached to these specific values. The point is that I have provided circuitry which can select voltage variations that are (1) much smaller than meaningless, normally occurring, random variations, and (2) have approximately the same variations as voice or other information signals. My invention is not limited to use with any particular system, but may be used in connection with any circuits required to detect meaningful voltage variations from among meaningless, randomly occurring voltage variations. I have cited an electronic switching system using a particular PNPN diode network because it is more likely than most to require a detection of such meaningful voltage variations. There are, of course, other systems using PNPN diode networks, such as Hussey et al. (U.S. Patent 2,951,124) and Kowalik (U.S. Patent 3,055,982) assigned to Bell Telephone Laboratories, Inc., and Automatic Electric Laboratories, Inc., respectively. Also, there are systems using other kinds of networks which could be cited. Thus, the utility of the invention is not to be construed as a limitation upon the citation of a specified system.

Accordingly, an object of this invention is to provide new and improved discriminator and pulse forming circuit. More particularly, an object is to detect and reform badly deteriorated dial or other control pulses. In this connection, an object is to detect such pulses having voltage variation characteristics which are much smaller than meaningless, randomly occurring variations. A more particular object is to separate dial and voice or other information signals having virtually the same voltage variations.

Another object of this invention is to provide a circuit which can detect and respond to dial or other control pulses that are passed through a PNPN diode network. Here, an object is to detect control pulses having voltage variations that are smaller than the IR drop across a number of cascaded PNPN diodes.

Also, an object is to provide a dial pulse control circuit having a high degree of voice current immunity.

In accordance with one aspect of this invention, a transistor operated in a common emitter configuration is biased for class A amplifier operation. The bias voltage on the emitter floats at the base bias voltage less the voltage drop across the base-emitter junction. This way, the bias potential difference between the base and emitter does not change as the bias voltage applied to the base drifts up or down. However, when a dial pulse or control signal voltage variation occurs, the base potential does change with respect to the emitter. Thus, an amplified replica of the dial pulse or control signal appears at the collector of the transistor. This collector voltage triggers a pulse former circuit of conventional design to produce a reformed dial pulse.

Voice current immunity results from a circuit at the amplifier input. A relatively small capacitor passes high frequency voice or other information signals to ground. A relatively large emitter bypass capacitor prevents degeneration of dial pulses. Low frequency dial or other control signal voltage variations cannot pass through the small capacitor to ground, but do pass through the large capacitor to prevent degeneration. Thus, these signals are available to trigger the pulse former circuit.

Figure 2:
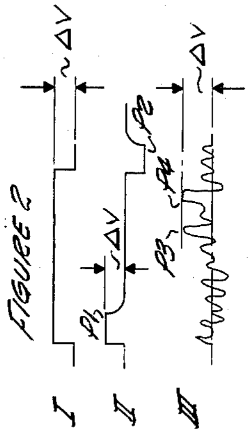

The above mentioned and other features of this invention and the manner of obtaining them will become more apparent, and the invention itself will be best understood by reference to the following description of an embodiment of the invention taken in conjunction with the accompanying drawings, in which:

FIG. 1 is a schematic circuit diagram which shows a discriminator and pulse forming circuit incorporating the principles of the invention; and FIG. 2 includes three voltage curves which help explain the circuit operation.

A telephone system shown in FIG. 1, includes an exemplary subscriber line 20 having a dial at one end and a line transformer 22 at the other end. The dial includes a set of contacts 21, which open and close responsive to the movement of a conventional finger wheel (not shown). A resistor 24 shunts the contacts to prevent the line from going open during dial pulses; therefore, instead of opening, the loop voltage drops to form dial pulses. The drop is due to the IR drop across the resistor.

A pulse discriminator circuit is shown at 30, and a pulse former is shown at 31. A PNPN diode switching network 32 interconnects subscriber line and the discriminator circuit.

A detailed knowledge about the operation of the network will become apparent from a study of the above mentioned Arseneau-Bereznak-Osborn application. Briefly, the PNPN network includes a number of cascaded diode matrices which switch "on" and "off" in a random manner to complete a switch path from one end marked point through the network to another end marked point. Thereafter, the network diodes depend upon a continuity of current flow to hold the path. For this reason, the voltage and current paths through the network must remain on within certain limits. These limits are held by limiting action of the transformer 22. In greater detail, as voltage variations below a threshold value appear in the primary windings W1, W2, flux changes occur in the transformer core C to induce corresponding voltage variations in the secondary winding W3. However, if the voltage variations in the primary windings W1, W2 exceed the threshold value, the transformer core C saturates, and there is no further flux change. Thereafter, the voltage in the secondary winding can not rise further. In the above mentioned exemplary system, this limiting occurs when the voltage in the secondary winding W3 reaches seven-tenths of a volt.

FIG. 2 illustrates how the transformer limiting occurs. Curve I shows the voltage change which occurs when contacts 21 open to generate a dial pulse or other control signal by inserting the loss of resistor 24 into the line. As indicated by the symbol $\Delta V$, the dial pulse voltage change exceeds the value required to saturate the transformer core C. Thus, the leading edge of the dial pulse or other control signal induces in the secondary winding W2, a first or positive going pulse P1, limited to the value $\Delta V$. The trailing edge of the dial pulse or other control signal induces in the secondary winding W2, a second or negative going pulse P2 also limited to the value $\Delta V$. Curve III shows the undulations of a voice or other information signal. Usually the voice or other information signal undulations are induced across the transformer without distortion. The peaks in the voice or other information signals are, however, limited to the same "$\Delta V$" value as the dial pulses are limited as shown at P3, P4. The problem is to recognize the dial pulses P1, P2 and reject the limited voice or other information signal peaks P3, P4.

In carrying out the invention, the dial or other control pulses are separated from the voice for other information signals in the pulse discriminator circuit. This separation means includes a first discriminator 40, a class A amplifier 41, a second discriminator 42, a pulse former 31 connected in cascade. Briefly, the first discriminator separates the dial or control pulses from the information signals. The second discriminator detects voltage variations which depart from a reference value by a predetermined amount. Upon detection of a departure of such an amount, a pulse former is triggered to produce a pulse of fixed characteristics.

In greater detail, the first discriminator 40 includes an input point *a*, at which a positive potential appears when a path fires through the network. In the exemplary system, this positive potential appearing at point *a* varied by as much as 2 volts—or three-to-four times more than the $\Delta V$ voltage that must be detected. The first detector also includes a resistor and battery 45 for biasing amplifier 41 to class A operation. A current limiting resistor 46, an isolating diode 47 and a voice immunity circuit 48 complete the detector 40. The voice immunity circuit is a relatively small capacitor connected between the point *b* and ground. This small capacitor provides a short circuit to ground for voice frequency signals. The extremely low frequency dial or other control pulses see an "open" at the capacitor 48 and, therefore, do not reach ground.

The class A amplifier includes an NPN transistor 50 coupled in a common emitter configuration. The transistor has an emitter electrode 51 which emits electrons, an input control or base electrode 52, and an output or collector electrode 53. The base electrode is direct coupled to discriminator 40 via current limiting resistor 54. The resistor 55 biases the emitter from ground G to provide class A amplification. A relatively large capacitor 56 bypasses the emitter biasing resistor. At the low frequency of dial or control pulses, all current changes pass through the large capacitor 56, there is no change in the IR drop across the resistor 55, and the amplifier 41 output is not degenerated. Thus, the dial or control signals are amplified.

The circuit values are selected so that the base and emitter electrodes 52, 51 float with respect to each other. That is, the voltage at point *a* might move upward or downward due to differences in the resistances of the PNPN diodes which happen to complete a random path from point *d* to point *a*. If so, the voltage at the emitter 51 also moves up or down because the base-emitter junction is a forwardly biased, low resistance, at class A operation. The point is that the potential difference between the base 52 and emitter 51 does not change with voltage variations at point *a*.

In greater detail, while the transistor 50 operates in a common emitter configuration with regard to signals, it is biased to function as an emitter follower device with regard to D.C. potential. A transistor (such as 53), which is forwardly biased to an emitter follower operation, has a remarkably stable voltage drop between its base and emitter electrodes. The emitter follower action, therefore, affects the bias potentials so that the D.C. potential on the emitter follows the D.C. potential at the base. In the amplifier 41 circuit, the actual signal path is through the base and out the collector with a phase inversion. This is why it is a common emitter type circuit with regard to signals.

While the invention is not limited to any particular circuit values, the following values were used in one circuit which functioned very well.

| | Values |
|---|---|
| Resistors: | |
| 45 | 1K |
| 46 | 3.3K |
| 54 | 180Ω |
| 55 | 18K |
| 58 | 10K |
| 65 | 1K |
| 60 | 82K |
| 61 | 39K |
| 63 | 4.7K |
| 73 | 4.7K |
| 71 | 33K |
| 72 | 1K |
| Capacitors: | |
| 48 | 2.2 μf. |
| 56 | 10 μf. |
| 64 | .22 μf. |

The stable state voltage at point *a* was nominally about +3.5 volts. All transistors and diodes were non-critical with regard to types; almost any devices with appropriate characteristics will function properly in this circuit.

When a dial or control pulse signal occurs, the base 52 to emitter 51 voltage does change. Therefore, an amplified replica of the dial or control pulse appears at point *f*. The difference between dial pulses and random, meaningless, voltage variations is the difference between a steady state D.C. voltage and a pulse of fixed length. When switching system 23 first seizes point *a*, there is a voltage change which may cause a change in the output of amplifier 41. But this occurs at a time when dial or control pulses cannot cause a circuit response. Thereafter, the voltage at point *a* is a steady state D.C. potential, and the base-to-emitter voltage of transistor 50 stabilizes. When a dial or control pulse appears, the charge on capacitor 56 changes and the base 52 to emitter 51 voltage changes to produce an effective output pulse. If the dial or control pulse should last long enough to become a steady stage D.C. potential, the capacitor 56 charge reaches stability. Thereafter the base-to-emitter voltage stabilizes, and the amplifier output disappears. But, a dial or control pulse does not last this long. At the end of a call, there is an output from amplifier 41 when the diodes switch "off," and while the charge on capacitor 56 changes, but this is too late to cause a current response.

The output of transistor 50 changes the current through a load resistor 58 and therefore the voltage at point *f*.

The second discriminator circuit 42, responds to voltage changes at point *f* which exceeds a predetermined value. The second discriminator 42 includes a voltage divider 60, 61 connected between a +12 volt battery and ground. An electronic switch 62 (a PNP transistor) has its base electrode connected to a point of reference voltage *g* on the voltage divider. The second discriminator is completed by a load resistor 63, a coupling capacitor 64, and a current limiting resistor 65.

Under quiescent conditions (no signal output from amplifier 41), the transistor 62 is biased "off" by the voltage at the point *f*. When a dial or control pulse appears, a voltage change applied through the capacitor 64 and resistor 65 to the point *g* switches the transistor 62 "on." Noise or other non-dial pulse voltage variations are too small to change the voltage at point *g* by an amount required to switch "on" the transistor 62.

The switch 43 includes a PNP transistor 70 having a base bias resistor 71, a load resistor 72, and a current limiting, direct coupling resistor 73. This switch is a logical redundancy which provides polarity inversion and some increase in reliability. It switches "on" and "off" each time that transistor 62 switches "on" and "off."

The pulse former circuit 31 may have any convenient design. It is here shown as a timer which conducts for a predetermined period of time. Each time the switch 43 turns "on," the pulse former puts out a pulse P5.

Upon reflection, it will be apparent that the discriminator and pulse forming circuit has the ability to detect dial or control pulses having voltage variation characteristics which are much smaller than meaningless, random variations which occur in the system. Moreover, the circuit separates dial or control pulses from voice and other information signals which have virtually the same voltage variations. Furthermore, the circuit is especially well suited for use with PNPN diode networks. In particular, the circuit can detect voltage variations which are less than the variations produced by minute diode differences. Still other advantages of the invention will be obvious to those skilled in the art.

While the principles of the invention have been described above in connection with specific apparatus and applications, it is to be understood that this description is made only by way of example and not as a limitation on the scope of the invention.

I claim:

1. A discriminator and pulse forming circuit comprising a first discriminator including a bypass to ground at information signal frequencies for separating pulses from information signals, a class A amplifier, a second discriminator including a reference voltage source for detecting voltage variations which depart from said reference voltage by a predetermined value, and a pulse former, said discriminator, amplifier and former circuits being connected in cascade, a plurality of randomly selected input circuits for said class A amplifier, said input circuits having two output voltages which differ from each other, means for biasing said class A amplifier to a level of conductivity which varies directly with the output of said input circuits, means responsive to signal variations from said input circuits for causing corresponding changes in the output of said amplifier, and means responsive to said output changes for forming pulses having predetermined output characteristics.

2. A discriminator and pulse forming circuit comprising a first discriminator for separating pulses from information signals, a class A amplifier, a second discriminator for detecting voltage variations which depart from a reference potential by a predetermined value, and a pulse former connected in cascade, said class A amplifier comprising a transistor connected in a common emitter configuration, means for biasing said transistor at a level of conductivity where the emitter and base electrodes float at approximately the same voltage for D.C. input conditions, and means for applying input signals to said base electrode, whereby the amplifier output changes with input pulse voltage changes but does not change as the floating D.C. voltage changes.

3. A discriminator and pulse forming circuit comprising a cascaded circuit including a first circuit having a high frequency passing characteristic for separating pulses from information signals, a class A amplifier, a second circuit for detecting voltage variations which depart from a reference potential by a pretermined value, said second circuit including means for making said circuit relatively immune to said high frequency signals, and a pulse former, said class A amplifier comprising a transistor connected in a common emitter configuration, means for biasing said transistor at a level of conductivity where the D.C. potentials on the emitter and base electrodes change together so that the difference between said D.C. potentials remains at approximately the same voltage, means for applying input signals to said base electrode, and means whereby the amplifier output changes with signal voltage change but does not change as the D.C. potentials change.

4. A discriminator and pulse forming circuit comprising a class A amplifier, said amplifier including at least an electron emitting electrode, an input control electrode, and an output electrode, the bias voltage on said control electrode being subject to random voltage variations, means for biasing said electron emitting electrode to change as a function which varies directly with said random voltage variations, whereby the bias potential difference between said control and said electron emitting electrodes does not change with said random voltage variations, and means responsive to a change in the output of said class A amplifier which change exceeds a predetermined value for selectively forming a pulse having predetermined characteristics.

5. A discriminator and pulse forming circuit comprising a class A amplifier, the input voltage of said amplifier being subject to meaningless, random D.C. voltage variations which change with the characteristics of input circuits connected thereto, means for providing an amplifier bias which floats with said meaningless, random D.C. voltage variations, whereby the potential difference between said input and said bias does not change with said random D.C. voltage variations, and means responsive to a change which exceeds a predetermined value in the output of said class A amplifier for selectively forming a pulse having predetermined characteristics.

6. A discriminator and pulse forming circuit comprising a common emitter transistor circuit for providing class A amplification, said transistor including emitter, base and collector electrodes, the bias voltage on said base electrode being subject to meaningless, random voltage variations, means for biasing said emitter electrode to float with said random voltage variations, whereby the bias potential difference between said base and said emitter electrodes does not change with said random voltage variations, means for applying meaningful voltage variations to said base electrode, and means responsive to a change in the output of said class A amplifier responsive to said meaningful voltage variation for selectively forming a pulse having predetermined characteristics.

7. A telephone system comprising at least one subscriber line having resistivity shunted dial pulsing contacts at one end for transmitting D.C. pulses over said line and a line transformer at the other end, a discriminator and pulse forming circuit, a switching network for interconnecting said transformers and said discriminating and forming circuit, said transformer limiting all signals occurring on said line to less than a threshold voltage which can pass through said network, and means in said discriminating circuit for separating said D.C. dial pulses from voice signals passing through said network according to the frequency of said signals and duration of said dial pulses.

8. The telephone system of claim 7 wherein said separating means comprises a relatively small capacitor for bypassing voice frequency signals to ground and causing response to fixed length pulses.

9. A telephone system comprising a plurality of subscriber lines having resistively shunted dial contacts at one end for sending D.C. pulses over said line and a line transformer at the other end, a discriminator and pulse forming circuit, a PNPN diode switching network for interconnecting said transformers and said discriminating circuit, said transformers limiting all signals occurring on said lines to less than a threshold voltage which can pass through said network, said discriminating and pulse forming circuit comprising a first discriminator for separating pulses from information signals, a class A amplifier, a second discriminator for detecting voltage variations which depart from a reference potential by predetermined value and a pulse former connected in cascade, said class A amplifier comprising a transistor connected in a common emitter configuration, means for biasing said transistor to a level of conductivity at which the emitter and base electrodes float at approximately the same voltage, means for applying signals from said line to said base electrode, and means responsive to the amplifier output for switching from one voltage to another voltage responsive to signals originating at said dial contacts but for not switching responsive to changes in the level of the floating voltage.

10. The telephone system of claim 9 wherein said switching means comprises a relatively small capacitor for bypassing voice frequency signals to ground and causing response to fixed length pulses.

11. A telephone system comprising a plurality of subscriber lines for carrying voice frequency signals, dial contact means connected to one end and signal limiting means connected to the other end of each of said lines, means comprising said dial contacts for selectively sending trains of D.C. pulses over said line, there being any number from one to ten of said D.C. pulses in each of said trains, a discriminator and pulse forming circuit, means for interconnecting said limiting means and said discriminating circuit, means in said discriminating circuit for separating said dial pulses from said voice frequency signals, said last named means comprising a frequency selective circuit for conducting said voice frequency signals to ground and a timing means for limiting said discriminator response to D.C. signals having less than a predetermined duration.

References Cited by the Examiner

UNITED STATES PATENTS

| | | | |
|---|---|---|---|
| 2,299,822 | 10/42 | Horton et al. | 179—84 |
| 2,503,371 | 4/50 | Bachelet | 340—147 |
| 2,552,013 | 5/51 | Orpin | 340—167 |
| 2,912,579 | 11/59 | Bates | 340—147 |
| 2,951,124 | 8/60 | Hussey et al. | 178—18 |
| 2,978,615 | 4/61 | Chater | 307—88.5 |
| 3,047,735 | 7/62 | Rosier | 307—88.5 |
| 3,055,982 | 9/62 | Kowalik | 179—18 |
| 3,122,650 | 2/64 | Stern et al. | 307—88.5 |

ROBERT H. ROSE, *Primary Examiner.*

WALTER L. LYNDE, *Examiner.*